United States Patent [19]
Jägers

[11] 3,853,028
[45] Dec. 10, 1974

[54] MECHANICAL DEVICE FOR COLD-SAWING STEEL-PROFILES, ETC. UTILIZING A VERTICAL DISPLACEABLE SAW BLADE

[76] Inventor: Leopold Jägers, Rudolf-Diesel-Strasse 1, 5350 Euskirchen, Germany

[22] Filed: May 23, 1973

[21] Appl. No.: 363,103

[30] Foreign Application Priority Data
May 24, 1972 Germany.......................... 2225197

[52] U.S. Cl.................. 83/461, 83/462, 83/465, 83/467, 83/471.3, 83/925 R
[51] Int. Cl....... B26d 7/02, B26d 1/14, B26d 33/45
[58] Field of Search ............ 83/452, 458, 461, 462, 83/465, 466, 467, 455, 471.3, 925 R

[56] References Cited
UNITED STATES PATENTS
| | | | |
|---|---|---|---|
| 594,019 | 11/1897 | Jefferies................................ | 83/461 |
| 3,672,251 | 6/1972 | Jagers.................... | 83/467 X |

Primary Examiner—Willie G. Abercrombie
Attorney, Agent, or Firm—Holman & Stern

[57] ABSTRACT

Apparatus for sawing metal elements transversely at a plurality of angles by means of a vertically-displaceable blade in which there is provided a bench top including an angularly adjustable clamp stop at one side of the axis of rotation of the saw-blade, and a pair of opposed clamp stops are adjustable at the opposite side of the axis of rotation of the saw-blade for permitting the saw to effect transverse cuts at various angles while the work piece is urged into the bench top by a vertical, adjustable stop. The machine base means permits the saw to be adjusted angularly and longitudinally of the work piece on an axis of rotation coinciding with an abutment edge of one stop toward which the work piece being cut is urged when a cut is being made.

8 Claims, 16 Drawing Figures

MECHANICAL DEVICE FOR COLD-SAWING STEEL-PROFILES, ETC. UTILIZING A VERTICAL DISPLACEABLE SAW BLADE

FIELD OF THE INVENTION

The instant invention concerns a mechanical device for cold-sawing steel profiles etc. utilizing a vertical displacement of a saw-blade, and an adjustable stop or clamp means for fixedly holding a work piece being cut on a horizontal bench for positioning the work piece.

BACKGROUND OF THE INVENTION

In such a mechanical device, difficulties and excessive labor result in holding the work piece secure in order to perform an individual cut and particularly, if a large work piece, for example, a large steel-beam, is to be cut consecutively at various angles.

SUMMARY OF THE INVENTION

The object of the instant invention is to simplify the cutting operation of various sections by means of a simplified clamping device, primarily in a manner so that these operations can be controlled.

In accordance with the instant invention, this problem is solved by an adjustable stop and clamp means, against a vertical abutting area of which the work piece is pressed by means of a saw blade, this means can be adjusted and affixed on a horizontal circular arc way, the center of which is positioned in a sectional plane of the saw blade and preferably, this circular arc direction is provided on an intermediate plate.

The circular arc way or intermediate plate which carries the circular arc way is horizontally movable in one embodiment of the instant mechanical device relative to the center or cutting plane of the saw blade. In this case, preferably a hydraulically operable device is provided on the bench top for securely positioning the stop means relative to the bench top. Such circular saws may preferably be of such a design that the bench is rotatable on a horizontal base on an axis passing vertically through the center of the saw blade.

In another embodiment, the circular arc way which carries the bearing, or the intermediate plate which supports the circular arc way, is fixedly attached on a stationary base of the machine and that part of the mechanical device supports a counter-stop means and the saw blade is arranged on this base so as to be pivoted on a vertical axis which extends preferably through the center of the stop face of the stop means. In this embodiment, it is also proposed that the part of the machinery which supports the counter stop and the saw blade be horizontally adjustable in contrast to the above-mentioned base in the plane of the saw blade.

Preferably, a supporting column is fixedly connected with a machine-seat and guides the saw blade, together with its gear housing, in the direction of advance, whereby the vertical symmetrical axis lies in the plane of the saw blade.

BRIEF DESCRIPTION OF THE DRAWINGS

The drawings illustrate various embodiments of the instant invention, whereby.

DESCRIPTION OF PREFERRED EMBODIMENTS

In a mechanical saw device according to FIGS. 1 to 4, the frame of the device comprises a machine-base 1, including a bench top 2, and a support column 3 for vertically guiding a gear-housing 4 upon which is journaled a saw blade 5. The base 1 is provided at its two longitudinal sides with tanks 6 for receiving the saw-chips and used cooling-liquid. On the support column 3, which is rectangular, is a guide plate 7 perpendicular to top 2 which is spanned by and guides a sliding carriage 8; the sliding carriage 8 is secured to the gear housing 4.

Figure 1:
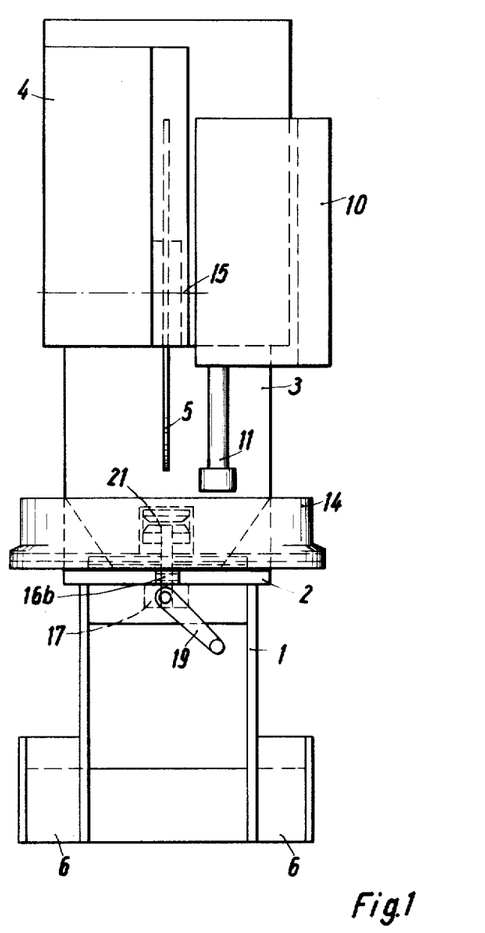
FIG. 1 is a front elevational view of the mechanism in accordance with the instant invention.
Figure 2:
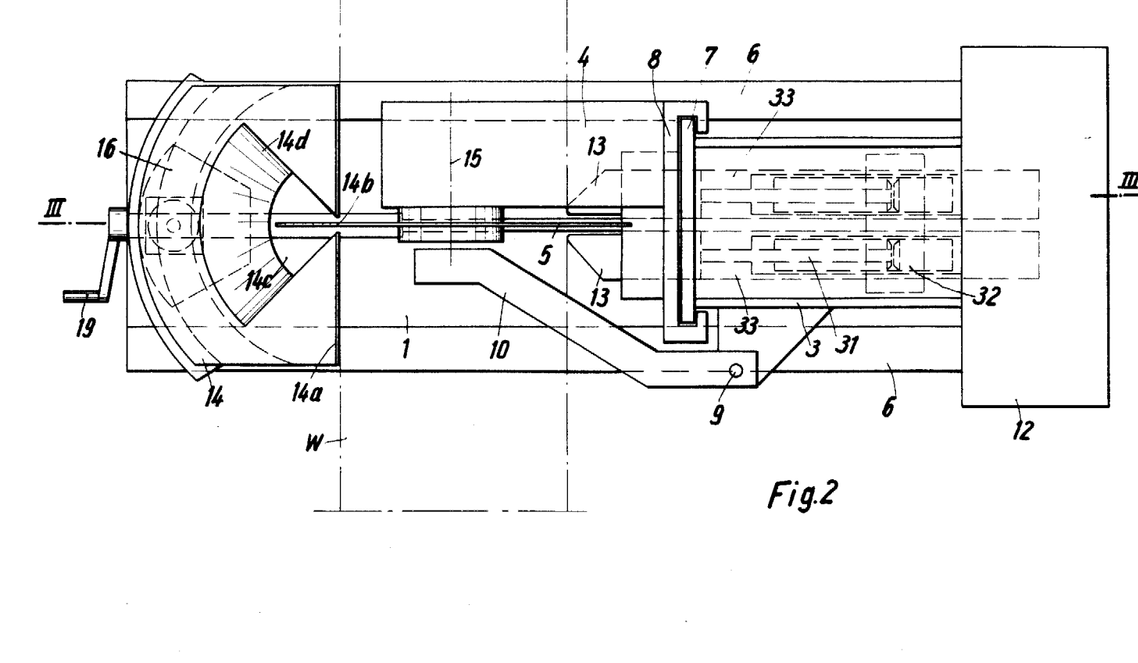
FIG. 2 is an enlarged top plan view of FIG. 1.
Figure 3:
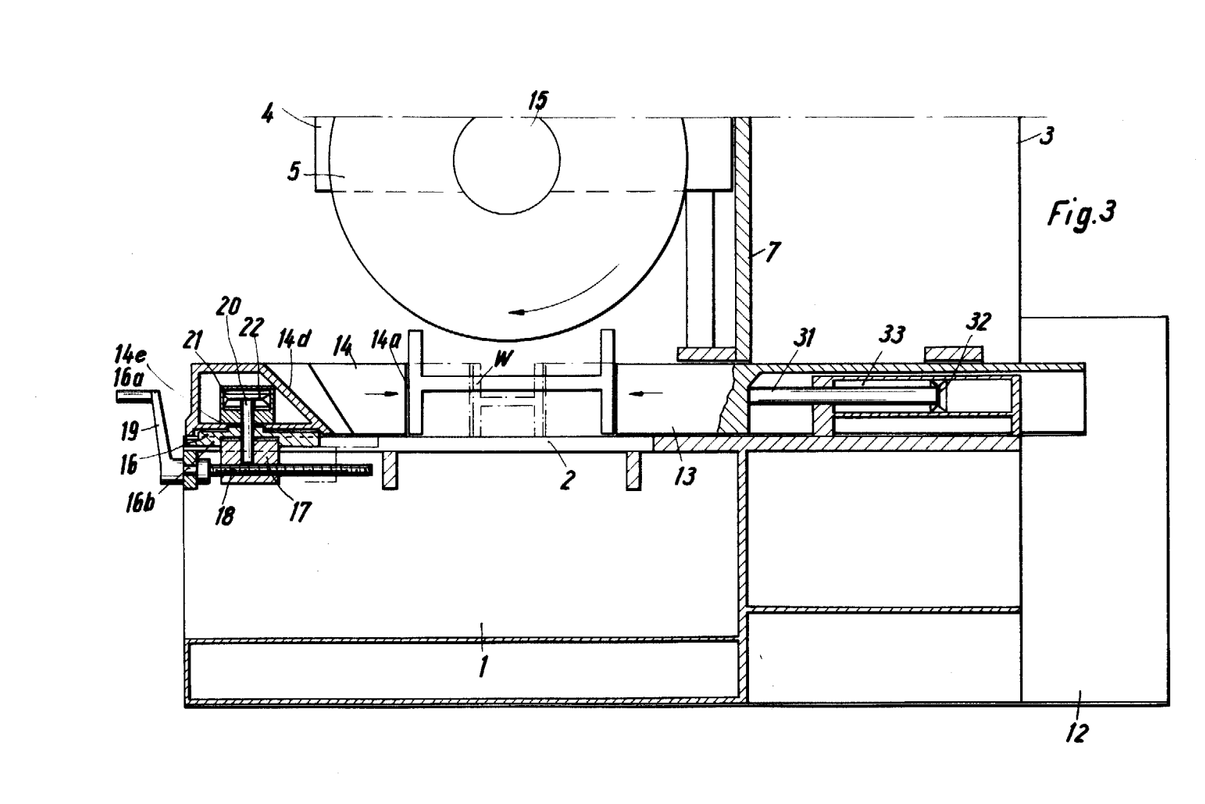
FIG. 3 is a vertical cross section taken substantially on the plane of line III—III of FIG. 2.

Opposite the plane of saw blade 5 (FIG. 2) is a sleeve 10 pivotally mounted by means of a pivot pin defining a vertical axis 9; the sleeve 10 carries at its end-portion a vertically controllable stop element 11 by means of which a work piece W can be urged downwardly in a vertical direction towards the bench top 2 (FIG. 3). At one end section of the machine base 1, there is arranged a housing 12 for a hydraulic controls, which serves to activate the movable stop parts of the saw. In order to securely clamp the work piece W to the bench top 2, there are provided on top 2, parallel to the plane of the saw blade 5, a first pair of adjustable stops 13 (FIG. 2). Through the arrangement of the stops 13 on opposite sides of the cutting plane of the saw blade, the two sides of the work piece W are securely urged or clamped against an adjustable clamp or stop means 14, as explained in detail below. The stop means 14 is positioned opposite the stops 13 also at opposite sides of the saw blade, and spaced relative to axis 15.

Figure 5:
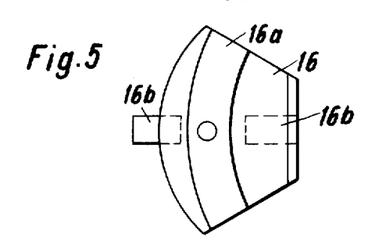
FIG. 5 is a top view of an intermediate plate of FIG. 2.
Figure 6:
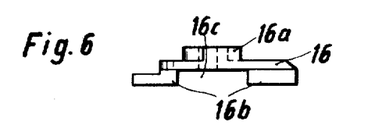
FIG. 6 is a side elevational view of FIG. 5.
Figure 7:
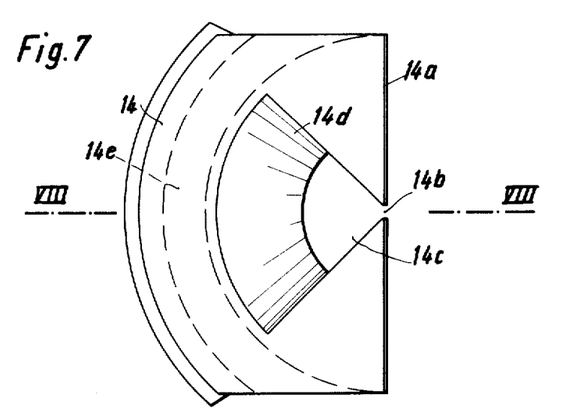
FIG. 7 is a top view of the adjustable stop means or limit means.
Figure 8:
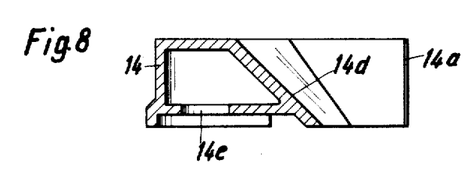
FIG. 8 is a cross section taken on the plane of line VIII—VIII of FIG. 7.

The stop means 14 (FIGS. 2–4, 7 and 8) includes a vertical contact area 14a, the height of which corresponds to the height of the contact surface of the stops 13. The contact surface 14a is interrupted at its center with a vertical slot-shaped opening 14b which enlarges into an aperture 14c at a 90° angle. Adjacent the aperture 14c is an upwardly inclined surface 14d which terminates in a plane coincident with the height of the vertical contact surface 14a. The stop means 14 is provided at its undersurface with a clearance 14e (FIGS. 3 and 8) in the form of an arc of a circle having its center at the slot 14b (FIG. 7). Into this clearance 14e is engaged a correspondingly shaped circular band or rib 16a comprising a part of a circular-segmental intermediate plate 16. The intermediate plate 16 is provided at its bottom surface with spaced guide elements 16b (FIGS. 3, 5 and 6) which fit into mating grooves formed in the bench top 2 in the cutting plane defined by the circular saw blade 5. At the bottom surface of the plate 16 is a clearance 16c, into which is engaged a carrier member 17 which is adjustable on the bench top 2 by means of a threaded shaft 18 integral with a crank 19. Member 17 is provided with a vertical piston rod 20 which extends through band 16a into a hydraulic cylinder 21 which is formed in a hollow area of the stop means 14, and the rod 20 terminates in a piston 22 in cylinder 21. The cylinder 21 communicates with hydraulic means (not shown in detail) arranged in the housing 12 in such a manner that under pressure of the hydraulic liquid, the cylinder 21 will be pressed against the lower part of the stop means 14.

Figure 4:
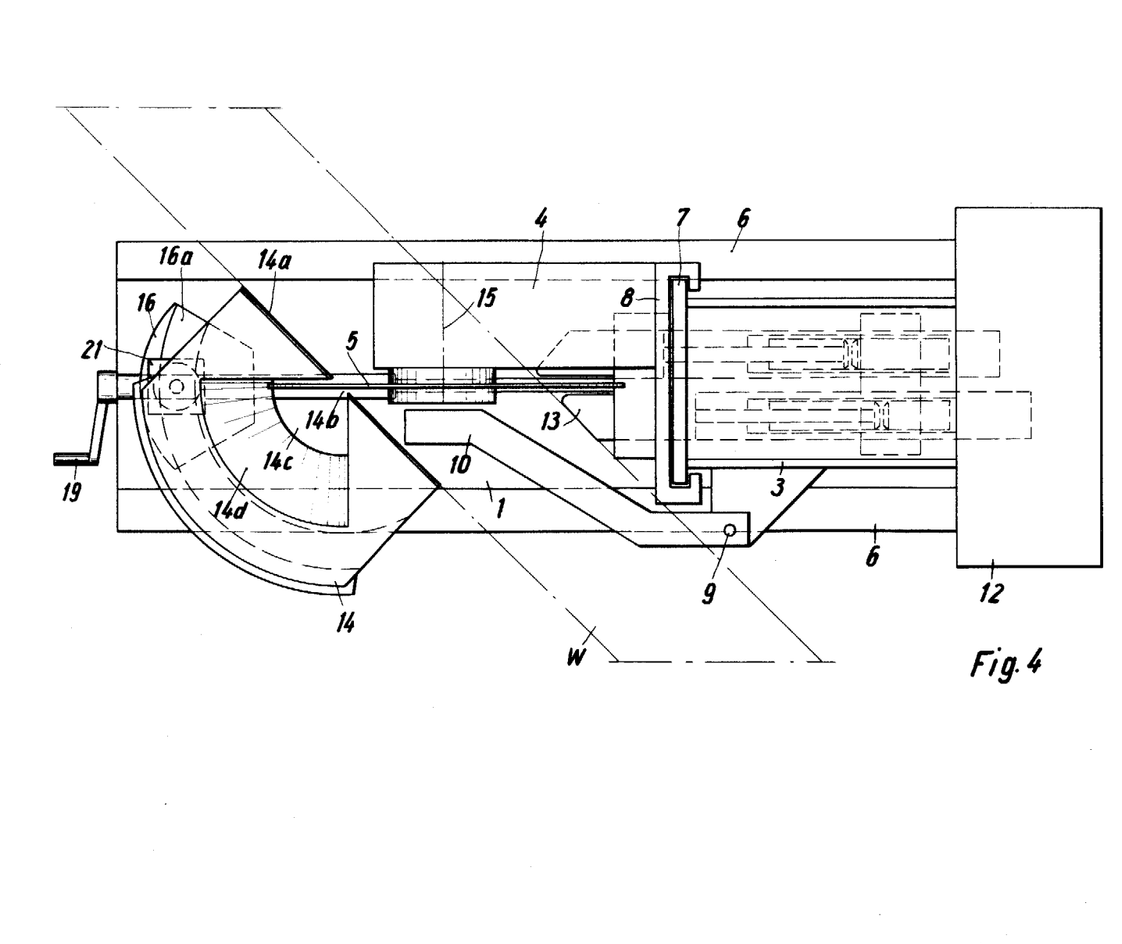
FIG. 4 is a top plan view showing the parts of FIG. 2 in a different position.

By actuating the hand crank 19, the stop means 14 in contrast to the stops 13, can be rotated to engage a work piece W of any random angles and width be retained between the stops (reciprocated) 14. By means of the stop element 11, it is possible to exert pressure from the top onto the work piece W toward the table 2. This stop element is hydraulically operated by means not shown. By rotating the stop means 14 on its circular guide 16a parallel to the plane of top 2, the stop means can be rotated at random angles between 0° to 45° in relation to the vertical plane of the saw blade axis. FIG. 4 shows an adjusted position of the stop means 14, in which the same is rotated in one direction at a 45° angle; in order to be able to rotate the same, the piston 22 must, of course, first be released. After the stop means 14 is adjusted to the desired angle, the piston 22 is again hydraulically actuated to brake further movement.

Considering FIGS. 2 and 4, it will be noted that when the angular adjustment is effected per stop means 14, the opposed stops 13 are adjusted accordingly. In FIG. 3, the stops 13 are each adjustably actuated through hydraulic means comprising a piston rod 31 secured to the stops 13 and the rod has a piston 32 disposed in a hydraulic chamber 33 operatively connected to suitable hydraulic pressure means (not shown). The saw 5 rotates toward contact surface 14a.

Figure 9:
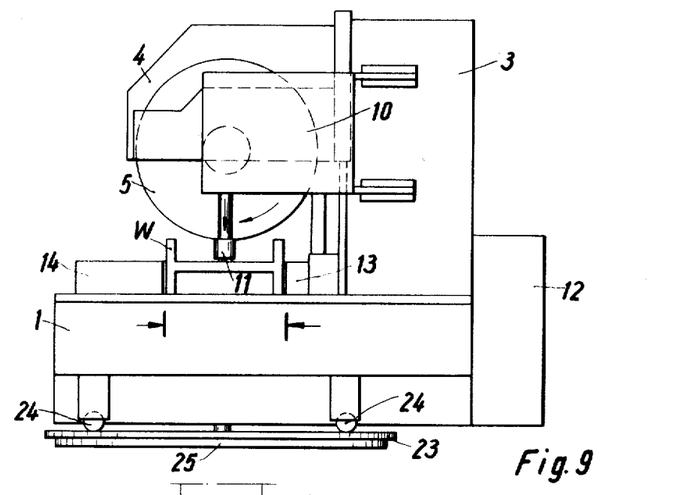
FIG. 9 is a side-elevational view of a modified embodiment of the invention.
Figure 10:
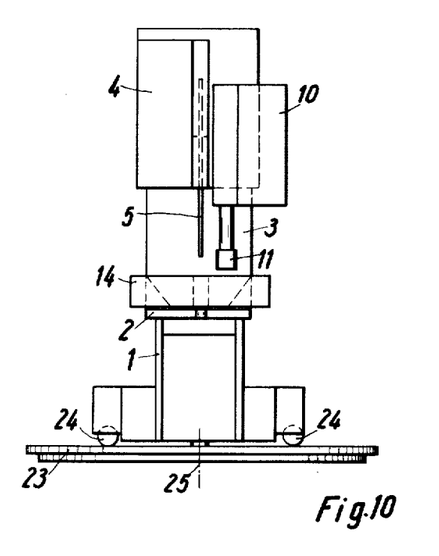
FIG. 10 is a front elevational view of FIG. 9.
Figure 11:
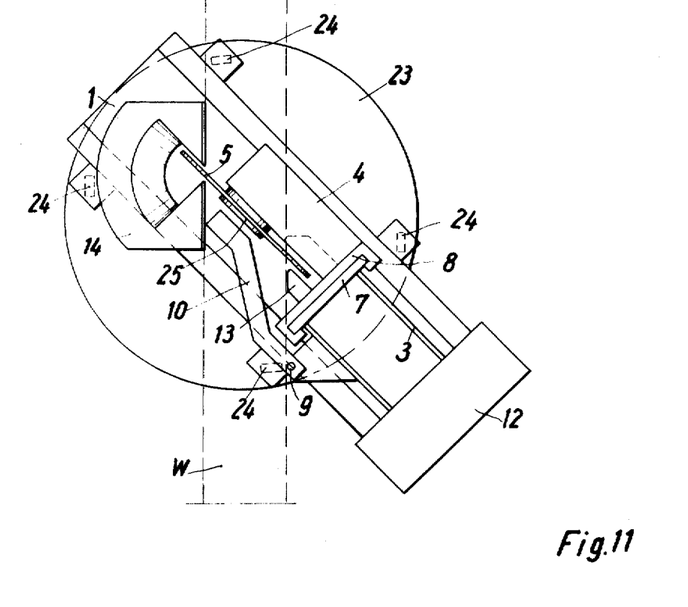
FIG. 11 is a top plan view of FIG. 9.
Figure 12:
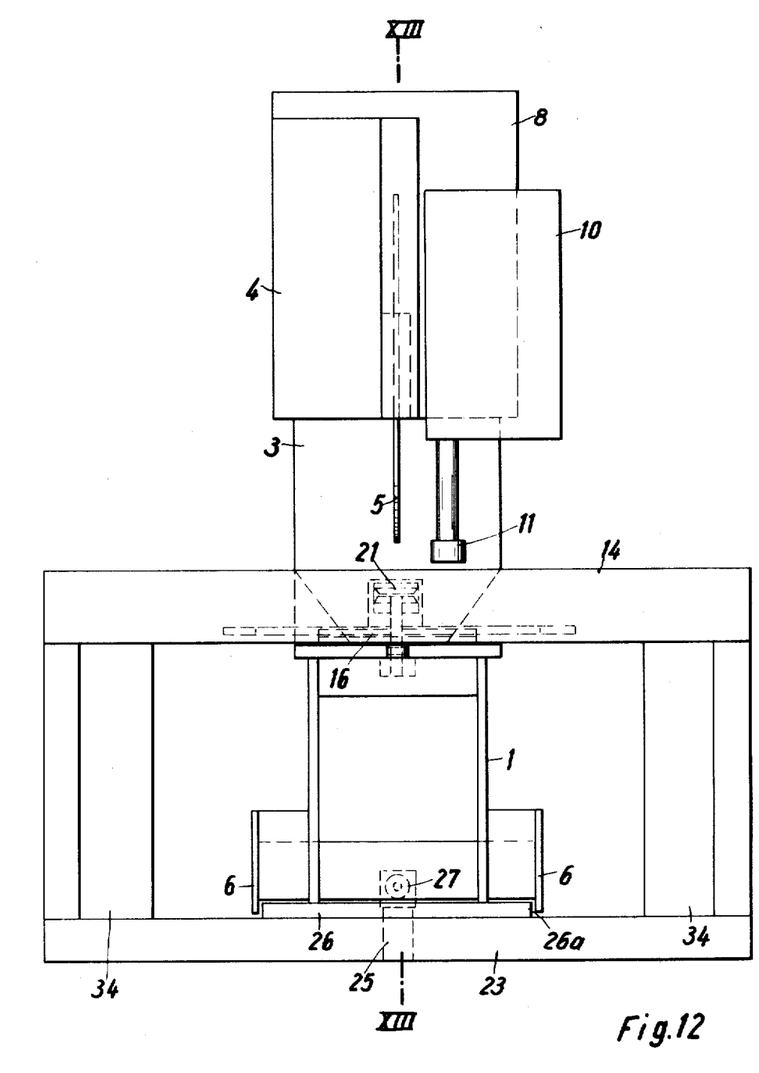
FIG. 12 is a front elevational view of still another modification of the invention.

In the embodiment of FIGS. 9 to 11, a horizontal base plate 23 for the apparatus is shown on which the entire base 1 of the mechanical device is disposed and it may be rotated about a vertical axis 25 by means of antifriction rollers 24. The axis extends through the center of the saw blade 5; otherwise, the functional parts of the mechanical device are in accordance with those previously described relative to FIGS. 1 to 8. The rotatable means via plate 23 and rollers 24 provides means to cut long workpieces W rectangularly as well as at other angles, for example, at angles of 45° to their longitudinal axis without requiring a change of the direction of these work pieces, i.e., the saw rotates instead of the work piece.

In the embodiment according to FIGS. 12 to 16, there is provided a horizontal plate 26 mounted on the base plate 23, with the plate 26 being rotatable by means of a vertical pin 25. The rotatable plate 26 is provided with vertical guides 26a having side edges 6 on which the machine base 1 can be longitudinally displaced and guided. For the purpose of moving the machine base 1 along guides 26a, a hydraulic cylinder assembly 27 is fixed to the machine bed (FIG. 13) with a piston 28 connected by means of a piston rod 29 to a projecting abutment 30 to the rotatable plate 26. Note that this stop means 14 is fixedly connected to the base plate 23 by means of vertical support means 34.

Figure 13:
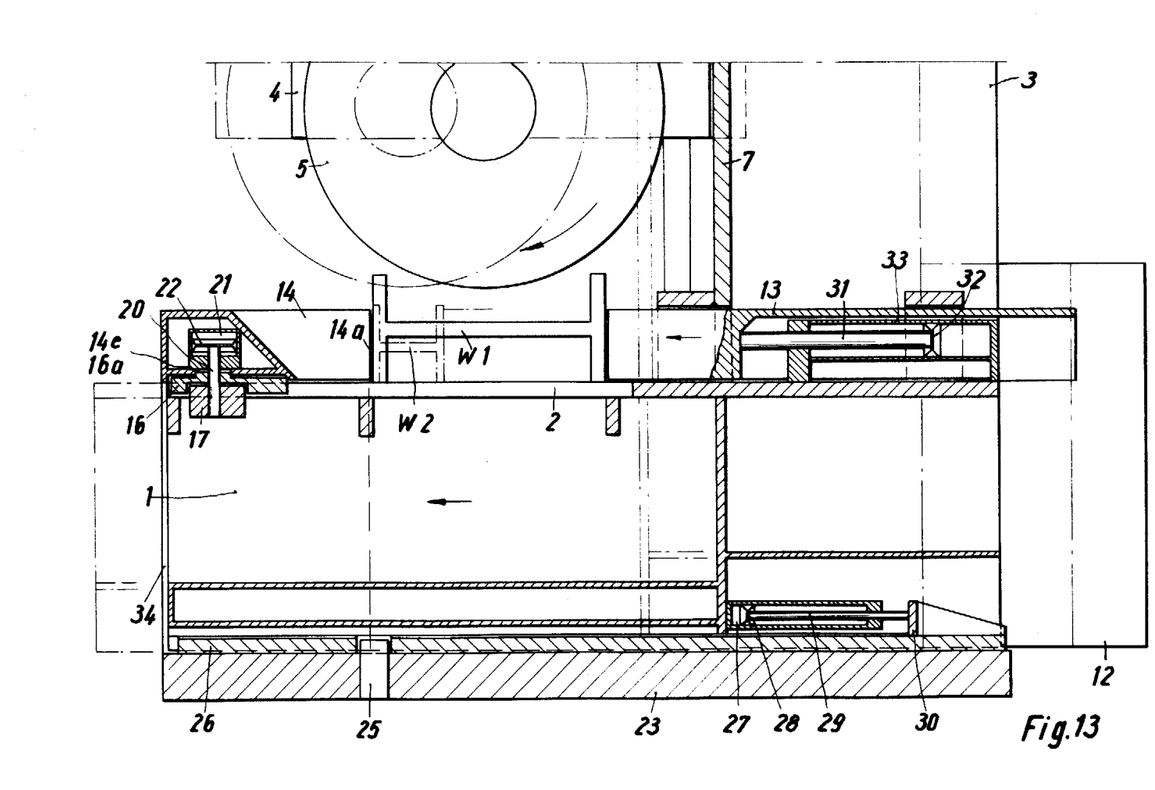
FIG. 13 is an enlarged longitudinal cross sectional view taken substantially on the plane of line XIII—XIII of FIG. 12.

FIG. 13 shows two different positions of the machine base 1, i.e., by solid lines there is shown a position for a maximum width work piece W while in the broken line position, there is shown adjustment for a much narrower work piece W2.

Figure 14:
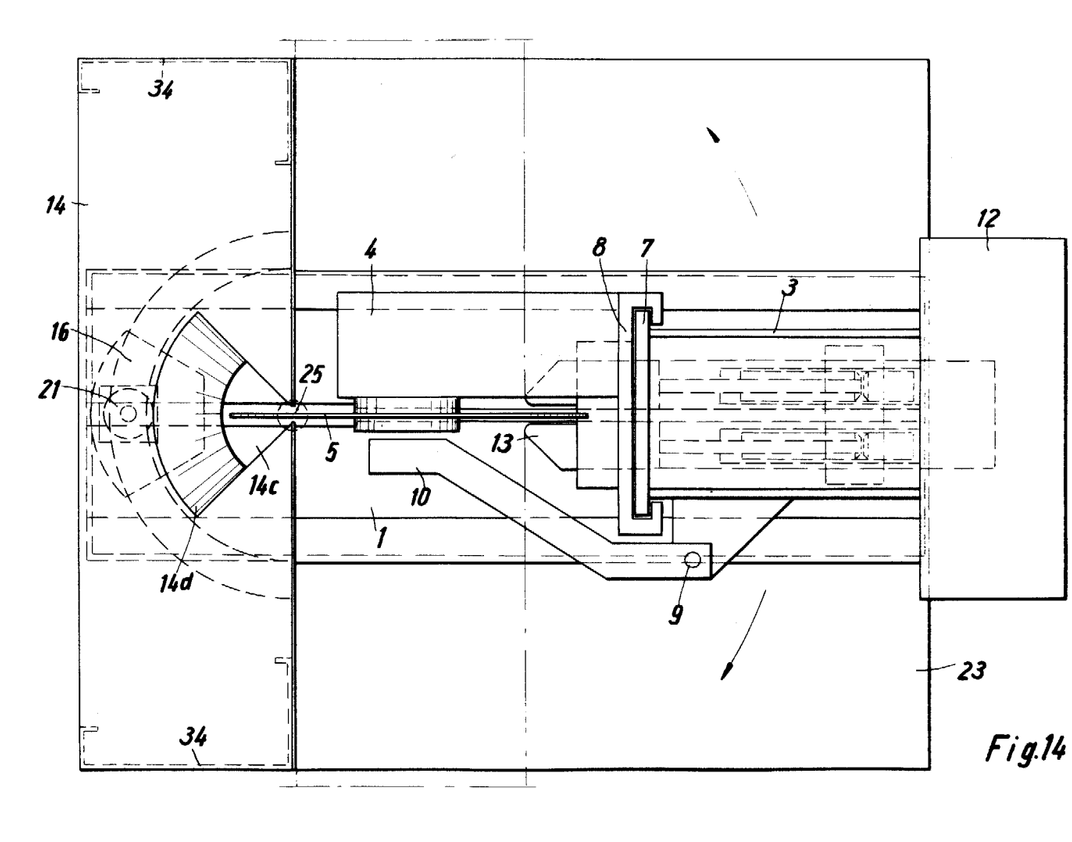
FIGS. 14 to 16 are top plan views of the embodiment of FIG. 12 showing the device in three different positions.
Figure 15:
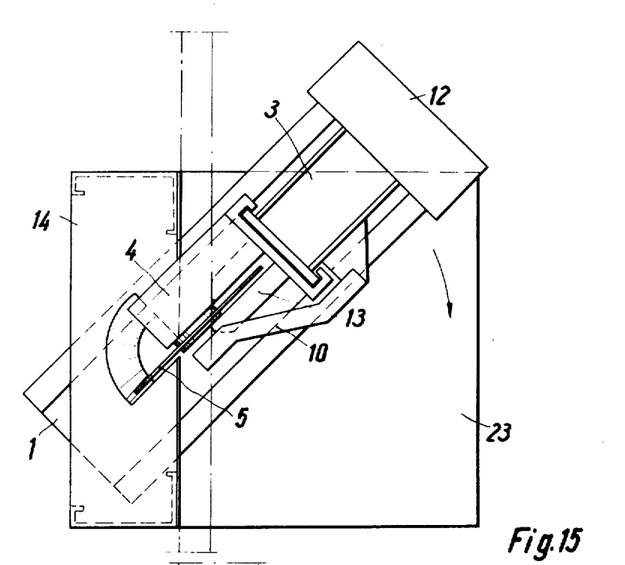
Figure 16:
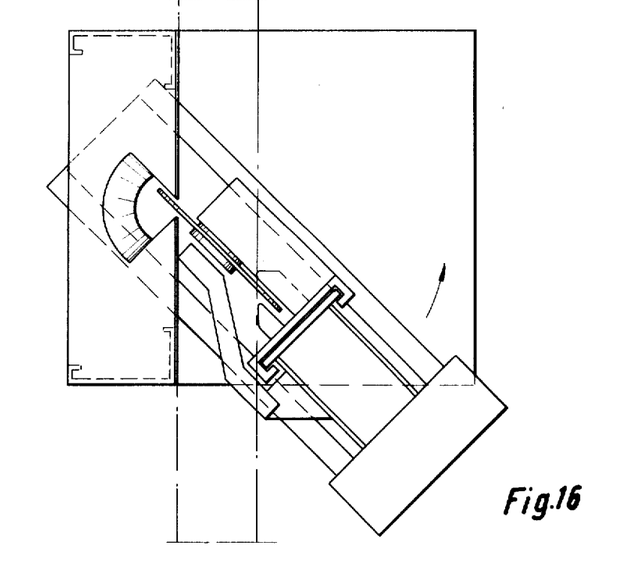

FIGS. 14, 15 and 16 illustrate the sawing apparatus in top plan, and show three different positions of adjustment by means of pin 25; FIG. 14 shows a 0° position (edge 14a is normal to the cutting plane of saw 5; FIG. 16 shows an adjusted position by 45° but 90° relative to FIG. 15; the machine base 1 relative to the base plate 23 in FIG. 15 is moved to one corner of the plate 23 as compared to FIG. 16.

The mechanical device has the advantage that the base plane, namely the stop area 14a, during rotation of the mechanical device for the purpose of performing miter cuts and during the adjusting of the mechanical device to different widths of the workpieces, remains the same. The prior art devices require adjusting abutting rollers on the entire, often extensive lengths of the work pieces, which is not required in the instant device. An additional advantage of the instant device lies in the fact that measurement for a miter cut is equal to the cutting measurement of a rectangular cut since the axis or center of the pivot pin 25 lies in the plane of the stop face 14a (FIG. 14).

I claim:

1. An apparatus for sawing steel profiles by a vertically displaceable circular saw blade overlying a horizontal work bench, including combined clamp and stop assemblies disposed on opposite sides of the blade for engaging the work piece at the opposite side at the area in which a vertical cut is to be made, the improvement in which one combined clamp and stop assembly includes a vertical abutment face for engaging one side of the work piece, said blade being rotatable toward said face for urging the work piece thereagainst as a cut is effected, said stop assembly including means for adjustably rotating said vertical abutment face relative to the cutting plane of said saw blade and the cutting plane of the saw blade intersecting and passing through said vertical abutment face, said vertical abutment face including a circular segmental guide having a center coinciding with the abutment face, and an intermediate plate secured to the work bench and having arcuate guide means upon which said stop assembly is adjustably mounted.

2. The structure as claimed in claim 1, including means for adjustably mounting said vertical abutment face toward and away from the axis of rotation of said saw blade.

3. The structure as claimed in claim 2 in which said intermediate plate includes depending guide elements extending radially from the arcuate guide means.

4. The structure as claimed in claim 2 including brake means engageable between said bench top and said stop assembly for retaining the stop assembly in an adjusted position.

5. The structure as claimed in claim 4 in which said brake means comprises a fluid pressure actuated assembly.

6. An apparatus for sawing steel profiles by a vertically displaceable circular saw blade overlying a horizontal work bench, including combined clamp and stop assemblies disposed on opposite sides of the blade for engaging the work piece at the opposite side at the area in which a vertical cut is to be made, the improvement in which one combined clamp and stop assembly includes a vertical abutment face for engaging one side of the work piece, said blade being rotatable toward said face for urging the work piece thereagainst as a cut is effected, said stop assembly including means for adjustably rotating said vertical abutment face relative to the cutting plane of said saw blade and the cutting plane of the saw blade intersecting and passing through said vertical abutment face, said stop assembly being integral with a base, said work bench including a counter stop opposite the adjustably-rotatable stop assembly, said work bench including means for rotating said saw blade and counter stop relative to said adjustably-rotatable stop assembly on a vertical axis of rotation.

7. The structure as claimed in claim 6 in which the vertical axis of rotation coincides with the vertical abutment of said stop assembly.

8. The structure as claimed in claim 7 in which said work bench is mounted for horizontal movement relative to the base and in the cutting plane of said saw blade whereby the saw is adjustable longitudinally relative to the work piece.

* * * * *